United States Patent
Nishida et al.

(10) Patent No.: US 7,852,713 B2
(45) Date of Patent: Dec. 14, 2010

(54) THERMAL-ASSISTED MAGNETIC RECORDING HEAD AND MAGNETIC RECORDING APPARATUS

(75) Inventors: Naoki Nishida, Kusatsu (JP); Manami Kuiseko, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1106 days.

(21) Appl. No.: 11/520,519

(22) Filed: Sep. 13, 2006

(65) Prior Publication Data

US 2007/0070824 A1 Mar. 29, 2007

(30) Foreign Application Priority Data

Sep. 28, 2005 (JP) .............................. 2005-283061
Jul. 25, 2006 (JP) .............................. 2006-202566

(51) Int. Cl.
*G11B 11/00* (2006.01)

(52) U.S. Cl. .................. 369/13.24; 369/13.33; 369/300

(58) Field of Classification Search ............... 369/13.01, 369/13.02, 13.24, 13.33, 13.32, 121, 112.28, 369/112.27, 44.37, 300, 13.17; 360/77.03, 360/59

See application file for complete search history.

(56) References Cited

U.S. PATENT DOCUMENTS

| | | | |
|---|---|---|---|
| 6,633,513 B1 * | 10/2003 | Kim et al. ................. | 369/13.13 |
| 6,940,803 B2 * | 9/2005 | Hatano ................... | 369/112.23 |
| 7,042,810 B2 * | 5/2006 | Akiyama et al. ......... | 369/13.33 |
| 2005/0078565 A1 | 4/2005 | Peng et al. ............... | 369/13.32 |

FOREIGN PATENT DOCUMENTS

| JP | 2000-149317 A | 5/2000 |
|---|---|---|
| JP | 2000-353336 A | 12/2000 |
| JP | 2001-326420 A | 11/2001 |
| JP | 2005-116155 A | 4/2005 |

OTHER PUBLICATIONS

I. Suzuki et al, "A Very Small Aperture Laser for Laser-Assisted Recording", Sharp Technology Report, No. 91, Apr. 2005, *Sharp Laboratories of America, Inc.*, pp. 26-30; Together with a partial English-language translation.

Japanese Notification of Reasons for Refusal dated Aug. 31, 2010, for counterpart Japanese Application No. 2006-202566, together with an English translation thereof.

* cited by examiner

*Primary Examiner*—Ali Neyzari
(74) *Attorney, Agent, or Firm*—Sidley Austin LLP

(57) ABSTRACT

A thermal-assisted magnetic recording head which heats a magnetic bit of a magnetic disk by light radiation in recording magnetic data into the magnetic disk with a magnetic writing element. The magnetic recording head has a reflecting converging element with a surface emitting laser incorporated therein, and a transparent plate serving as a slider. A laser beam emitted from the surface emitting laser is reflected by a mirror surface of the reflecting converging element and is converged on a plasmon probe formed on a bottom surface of the transparent plate. Thereby, near-field light effuses from the plasmon probe into a very small area and heats the magnetic bit of the magnetic disk.

16 Claims, 6 Drawing Sheets

SECTIONAL VIEW
IN LONGER AXIS

SECTIONAL VIEW
IN SHORTER AXIS

SECTIONAL VIEW
IN LONGER AXIS

SECTIONAL VIEW
IN SHORTER AXIS

SECTIONAL VIEW
IN LONGER AXIS

SECTIONAL VIEW
IN SHORTER AXIS

THERMAL-ASSISTED MAGNETIC RECORDING HEAD AND MAGNETIC RECORDING APPARATUS

This application is based on Japanese patent application No. 2005-283061 filed on Sep. 28, 2005 and Japanese patent application No. 2006-202566 filed on Jul. 25, 2006, the contents of which are incorporated herewith by reference.

BACKGROUND OF THE INVENTION

1. Field of the Invention

The present invention relates to a thermal-assisted magnetic recording head and more particularly to a thermal-assisted magnetic recording head which heats a recording bit by irradiation in recording data into a magnetic storage medium and a magnetic recording apparatus provided with the recording head.

2. Description of Related Art

In recent years, as storage media for storing information, various types of high-density magnetic storage media have been developed. These high-density magnetic storage media have a problem that the magnetic bits are significantly influenced by temperature, and the storage media must have high coercive force. The magnetic field used for recording data into the storage media having high coercive force must be strong. The upper limit of the strength of the magnetic field generated by a recording head depends on the saturation magnetic flux density. At present, the upper limit of the magnetic field strength is almost the limit determined by the material, and a large increase in the magnetic field strength cannot be expected any more.

As a countermeasure, a thermal-assisted magnetic recording method has been suggested. In the thermal-assisted magnetic recording method, immediately before a start of recording, a storage medium is partly heated, so that the magnetic force of the heated part of the storage medium becomes weaker. Then, recording is performed while the coercive force of the storage medium is weaker. Thereafter, the heated part naturally cools down, and magnetization of the recorded magnetic bits can be stabilized.

In the thermal-assisted magnetic recording method, the heating of the storage medium is preferably performed instantaneously, and a heating device is not allowed to be in contact with the storage medium. For the heating, usually, a method using light absorption is adopted. In the case of high-density magnetic recording, however, the diameter of the spot to be heated is approximately 20 nm, and because of diffraction limit, it is impossible to converge light on the very small spot by use of an ordinary optical system using propagated light.

In order to solve this problem, Japanese Patent Laid-Open Publication No. 2005-116155 (reference 1) suggests a method wherein near field light, which is not propagated light, is used for the heating. In the method, a laser beam with an appropriate wavelength is converged on a metal film with a size of several tens of nanometers (a plasmon probe) by an optical system, so that near field light (localized plasmon) is generated, and the near field light is used as a device for heating the recording bit.

In a magnetic recording apparatus, a storage medium is placed in a small space, and a recording head is inserted into a space not more than 1 mm. Therefore, it is almost impossible to arrange a light source and an optical system for irradiating the storage medium above the recording head, which is implemented by the optical/magnetic data storage apparatus disclosed by the reference 1. Then, in the magnetic recording apparatus, a very thin light directing device and a very thin light converging device are required.

Sharp Technology Report, Vol. 91, pages 26-30 discloses a method wherein a recording bit is heated by near-field light generated by a very small aperture laser. In this method, however, the laser must be arranged in proximity to a plasmon probe, and the fixing method and the wiring are complicated. Also, it is necessary to arrange a magnetic recording head and a near-field generator in proximity to each other, while it is necessary to consider physical interference between the laser and the recording head. In this method, therefore, it is impossible to make use of the feature of irradiation that a light emitting point and an irradiating point can be distant from each other.

Japanese Patent Laid-Open Publication No. 2000-149317 discloses that light is converged by a reflective mirror so as to generate near-field light, and Japanese Patent Laid-Open Publication No. 2000-353336 discloses that near-field light is generated by use of a beam splitter and an elliptic mirror. In these structures, however, optical elements, such as a collimator lens, an elliptic mirror, etc., are further necessary so as to direct light from the light source into the head. Accordingly, the optical system becomes thick, and it is difficult to employ these structures for the thermal-assisted magnetic recording apparatus.

SUMMARY OF THE INVENTION

It is an object of the present invention to provide a thermal-assisted magnetic recording head and a magnetic recording apparatus which do not require an excessive number of optical elements, which results in a simple structure and a thin type.

In order to attain the object, a first aspect of the present invention provides a thermal-assisted magnetic recording head comprising: a light source unit for emitting light in a direction separating from a surface of a magnetic storage medium; a first optical element for reflecting and converging the light emitted from the light source unit; and a second optical element for generating near-field light from the light converged by the first optical element.

A second aspect of the present invention provides a thermal-assisted magnetic recording head comprising: a light source unit for emitting light in a direction separating from a surface of a magnetic storage medium; a first optical element for reflecting and converging the light emitted from the light source unit; a second optical element for guiding the light converged by the first optical element; and a third optical element for generating near-field light from the light guided by the second optical element. The second optical element may be a waveguide.

The thermal-assisted magnetic recording head according to the first aspect or the second aspect of the present invention comprises a first optical element for reflecting and converging light emitted from the light source unit and a second or a third optical element for generating near-field light. Thereby, it is possible to heat a very small recording bit without using any other optical element. Further, the magnetic recording head is of a thin type and can be placed in a narrow space.

In the thermal-assisted magnetic recording heads according to the first and the second aspects of the present invention, an end surface emitting laser and a surface emitting laser are suited to be used as the light source unit. Further, the light source unit may comprise a light source and a light guide for guiding light from the light source, and the light guide may have, at an end, a reflecting surface for reflecting the guided light in a direction separating from the surface of the magnetic storage medium.

The first optical element has a reflecting surface for reflecting and converging the light emitted from the light source unit, and the reflecting surface may be a spheroid of revolution or may be a paraboloid of revolution. When the reflecting surface is a spheroid of revolution or a paraboloid of revolution, adjustment of the imaging magnification is easy. Alternatively, the first optical element may have a diffraction grating or a refractive index distributing type lens for reflecting and converging the light emitted from the light source unit.

A third aspect of the present invention provides a thermal-assisted magnetic recording apparatus comprising: the above-described thermal-assisted magnetic recording head; and a mechanism for moving the thermal-assisted magnetic recording head and the magnetic storage medium relatively with each other.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Embodiments of a thermal-assisted magnetic recording head and a magnetic recording apparatus according to the present invention are described with reference to the accompanying drawings. Although FIGS. 2b-6 are sectional views, hatching is omitted for simplification.

General Structure of Thermal-Assisted Magnetic Recording Apparatus; See FIG. 1

Figure 1:
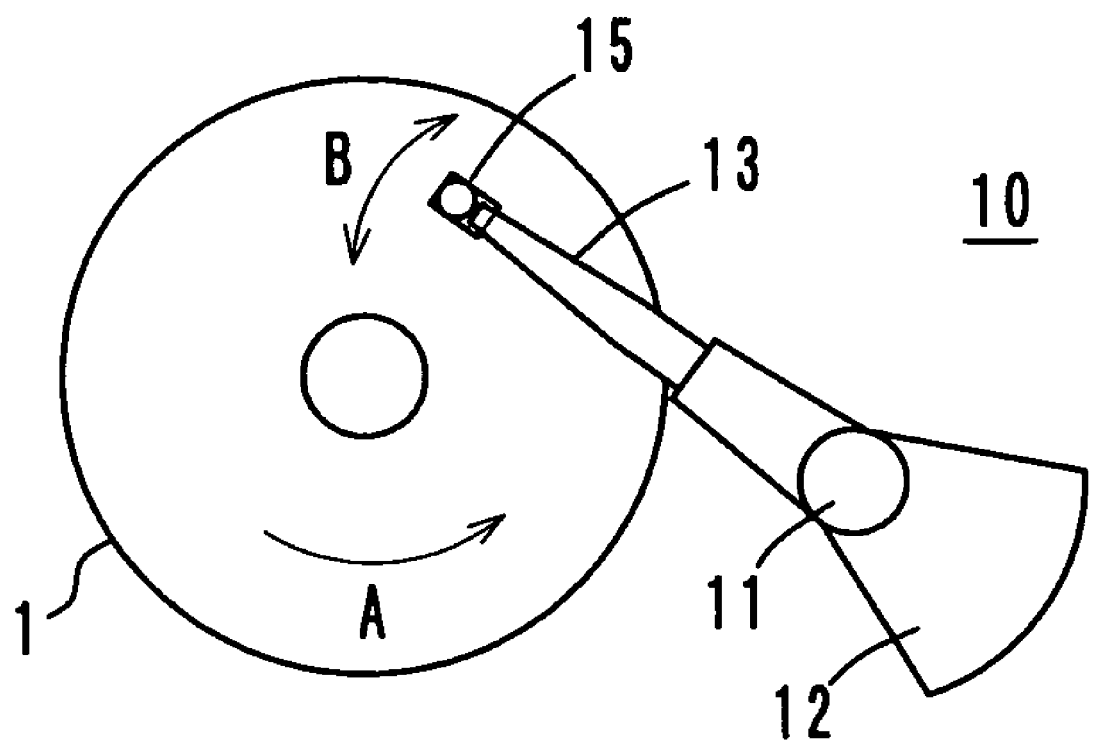
FIG. 1 is a schematic plan view of a recording apparatus provided with a thermal-assisted magnetic recording head.

FIG. 1 shows the general structure of a magnetic recording apparatus 10 provided with a thermal-assisted magnetic recording head 15 according to the present invention. In the magnetic recording apparatus 10, facing a magnetic disk 1 which is a storage medium driven to rotate in a direction "A", a suspension 13 is supported on a shaft 11 such that the suspension 13 pivots on the shaft 11 in a direction "B" (tracking direction). A tracking actuator 12 is provided for the suspension 13. In a tip of the suspension 13, a thermal-assisted magnetic recording head 15 is incorporated.

The magnetic disk 1 is of a conventional type having a recording layer in which magnetic data are recorded. On the recording layer, preferably, an anti-reflection coating is formed of a dielectric or a semiconductor.

First Embodiment; See FIGS. 2a and 2b

Figure 2A:
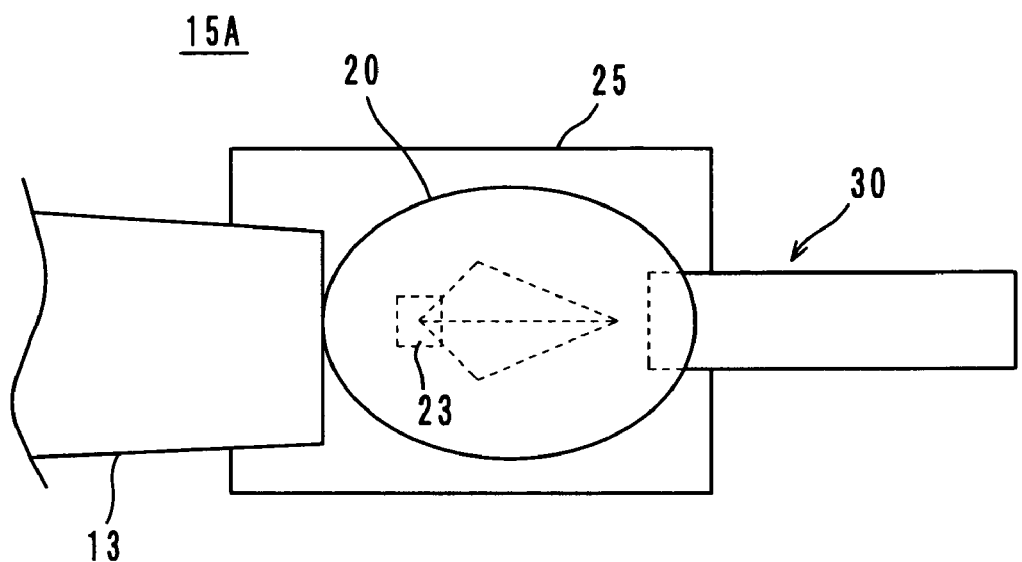
FIGS. 2a and 2b show a thermal-assisted magnetic recording head according to a first embodiment of the present invention, FIG. 2a being a plan view and FIG. 2b being a sectional view.
Figure 2B:
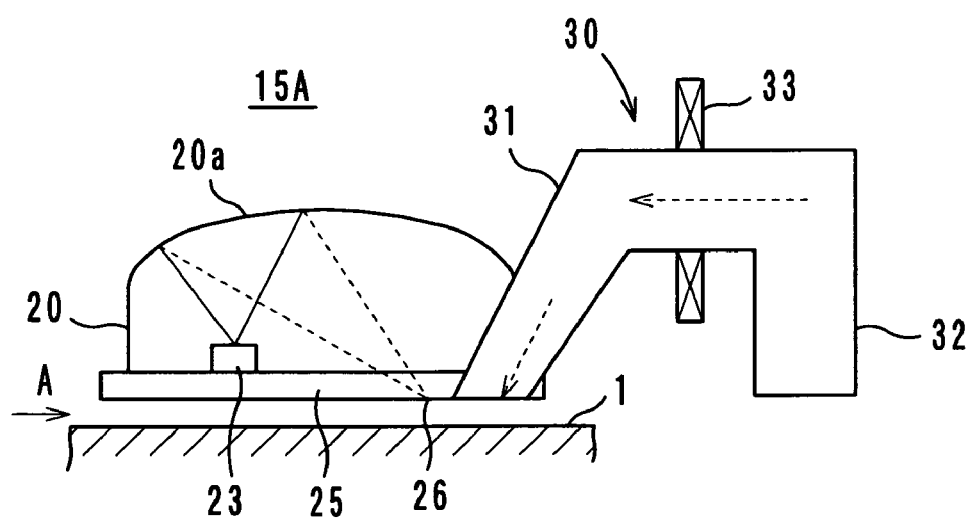

Referring to FIGS. 2a and 2b, a thermal-assisted magnetic recording head 15A according to a first embodiment of the present invention is described. The magnetic recording head 15A incorporated in the tip of the suspension 13 (see FIG. 1) comprises a reflecting converging element 20 for reflecting and converging light, a surface emitting laser 23 serving as a light source, a transparent plate 25 serving as a slider and a magnetic writing element 30 which are installed in the tip of the suspension 13.

The magnetic writing element 30 is of a conventional structure comprising a writing pole 31 and a yoke 32 integrated with each other and a coil 33. Magnetic force generated on the writing pole 31 by electrification of the coil 33 acts on the magnetic disk 1 via the tip of the pole 31, and thereby, a magnetic bit is magnetized.

The surface emitting laser 23 is fitted on a bottom of the reflecting converging element 20, that is, on the transparent plate 25. The surface emitting laser 23 emits a laser beam in a direction separating from the magnetic disk 1, and more particularly in a substantially vertical direction, upward in FIG. 2b. The reflecting converging element 20 is molded of, for example, resin and functions as a solid immersion mirror provided with a means for generating near-field light. The upper surface of the element 20 is a mirror surface 20a which is a spheroid of revolution or a paraboloid of revolution. As the light source, an end surface emitting laser may be used instead of the surface emitting laser 23. The spheroid of revolution and the paraboloid of revolution will be described later.

The transparent plate 25 is made of, for example, quarts and bonded to the bottom of the reflecting converging element 20. On a lower surface of the transparent plate 25, a very small structure (plasmon probe) 26 is formed of a thin film of a metal such as Au.

The laser beam emitted from the surface emitting laser 23 is reflected on the mirror surface 20a and is converged on the plasmon probe 26 formed on the transparent plate 25. Thereby, near-field light effuses from the plasmon probe 26 into a very small area and heats a magnetic bit of the magnetic disk 1. The magnetic force of the heated magnetic bit becomes weaker, and the magnetic bit is magnetized promptly in a specified direction by the writing pole 31.

In the thermal-assisted magnetic recording head 15A, as described above, the laser beam emitted from the surface emitting laser 23 is reflected and converged by the mirror surface 20a of the element 20 so that near-field light can effuse from the plasmon probe 26 formed on the plate 25. Therefore, other optical elements such as a collimator lens and a mirror are not necessary, which contributes to thinning of a magnetic recording head, and consequently, a space-saving magnetic recording head can be achieved.

Second Embodiment; See FIG. 3

Figure 3:
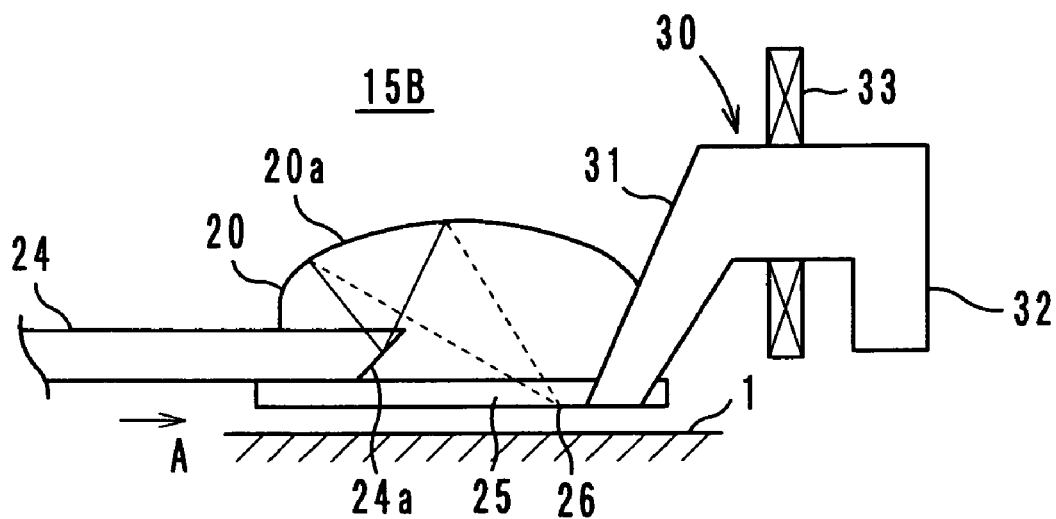
FIG. 3 is a sectional view of a thermal-assisted magnetic recording head according to a second embodiment of the present invention.

FIG. 3 shows a thermal-assisted magnetic recording head 15B according to a second embodiment of the present invention. As FIG. 3 shows, an end portion of an optical fiber 24 is inserted in the reflecting converging element 20, and a surface emitting laser (not shown) or an end surface emitting laser (not shown) is provided at a rear side of the optical fiber 24. The end surface 24a of the optical fiber 24 is slanted at an angle of 45 degrees and is coated with aluminum or the like so as to have a reflection coating thereon. The magnetic writing element 30 is of the same structure as that of the first embodiment.

A laser beam is guided to the end portion through the optical fiber 24 and is reflected by the end surface 24a to be directed upward in FIG. 3. This structure wherein a light guide with a reflecting surface at an end is used and wherein the reflecting end surface is placed in the reflecting converging element 20 is substantially equivalent to the structure according to the first embodiment wherein a light source itself is provided in the reflecting converging element 20. The laser beam emergent from the optical fiber 24 is reflected by the mirror surface 20a and is converged on the plasmon probe 26 formed on the transparent plate 25. Thereby, as in the first embodiment, near-field light effuses from the plasmon probe 26 into a very small area and heats the magnetic bit of the magnetic disk 1.

Third Embodiment; See FIG. 4

Figure 4:
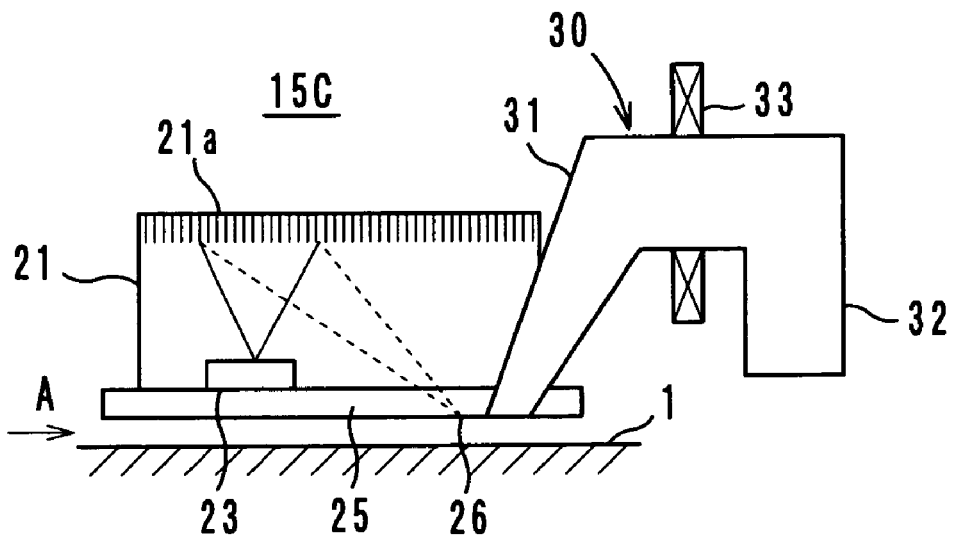
FIG. 4 is a sectional view of a thermal-assisted magnetic recording head according to a third embodiment of the present invention.

FIG. 4 shows a thermal-assisted magnetic recording head 15C according to a third embodiment of the present invention. According to the third embodiment, a Fresnel lens (diffraction grating) 21a is formed on an upper surface of the reflective converging element 21. Other parts and members are same as those of the first embodiment.

A laser beam emitted from the surface emitting laser 23 incorporated in the reflective converging element 21 is reflected by the Fresnel lens 21a and converged on the plasmon probe 26 formed on the transparent plate 25. Thereby, as in the first embodiment and in the second embodiment, near-field light effuses from the plasmon probe 26 into a very small area and heats the magnetic bit of the magnetic disk 1.

Fourth Embodiment; See FIG. 5

Figure 5:
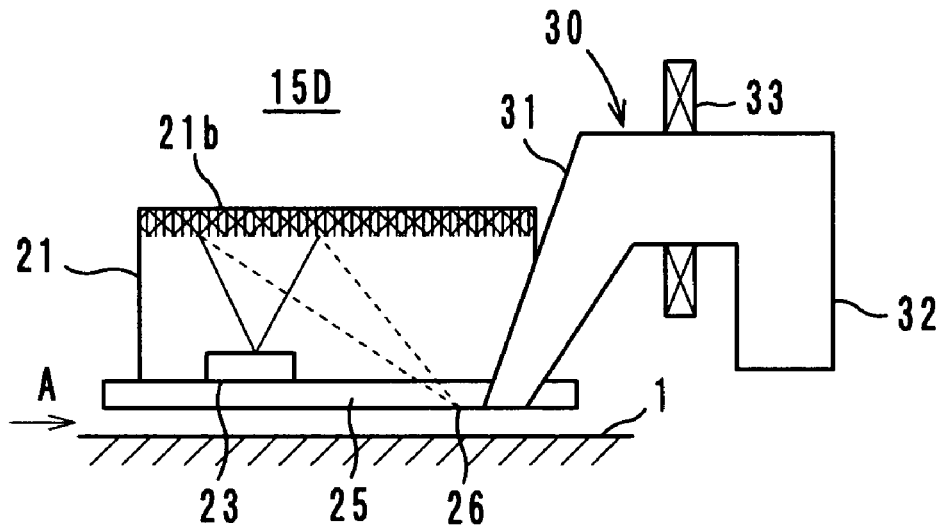
FIG. 5 is a sectional view of a thermal-assisted magnetic recording head according to a fourth embodiment of the present invention.

FIG. 5 shows a thermal-assisted magnetic recording head 15D according to a fourth embodiment of the present invention. According to the fourth embodiment, a refractive index distributing type lens 21b is formed on an upper surface of the reflective converging element 21. Other parts and members are same as those of the first embodiment.

A laser beam emitted from the surface emitting laser 23 incorporated in the reflective converging element 21 is reflected by the refractive index distributing type lens 21b and converged on the plasmon probe 26 formed on the transparent plate 25. Thereby, as in the first embodiment to the third embodiment, near-field light effuses from the plasmon probe 26 formed on the transparent plate 25 into a very small area and heats the magnetic bit of the magnetic disk 1.

Fifth Embodiment; See FIG. 6

Figure 6:
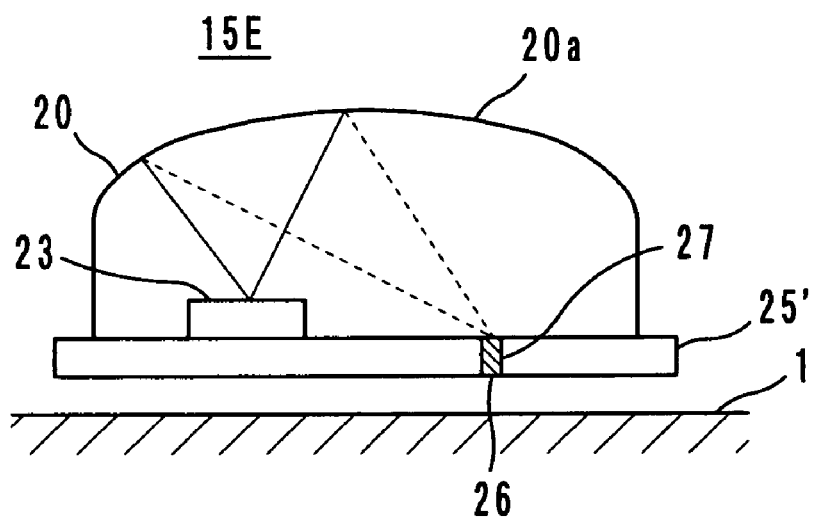
FIG. 6 is a sectional view of a thermal-assisted magnetic recording head according to a fifth embodiment of the present invention.
Figure 7A:
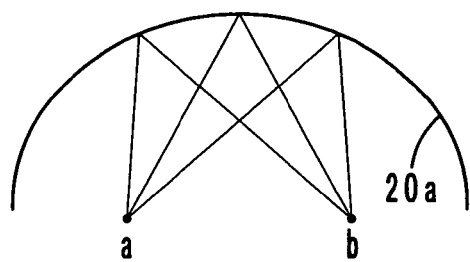
FIGS. 7a and 7b are illustrations showing a first exemplary spheroid of revolution.
Figure 7B:
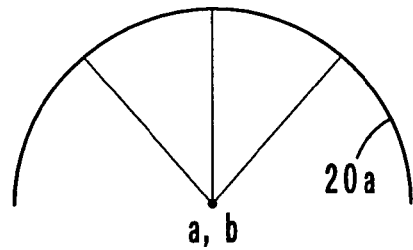
Figure 8A:
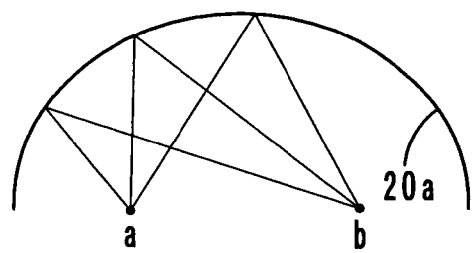
FIGS. 8a and 8b are illustrations showing a second exemplary spheroid of revolution.
Figure 8B:
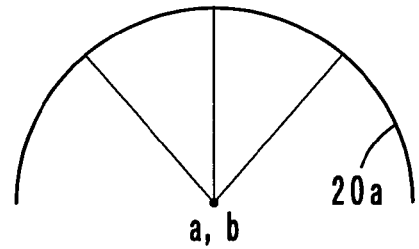
Figure 9A:
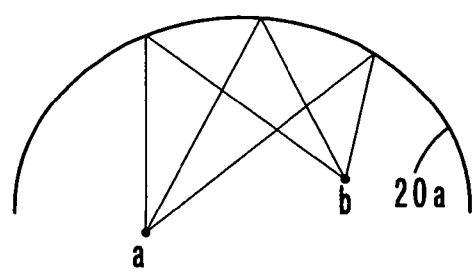
FIGS. 9a and 9b are illustrations showing a third exemplary spheroid of revolution.
Figure 9B:
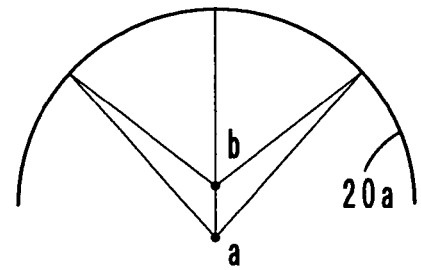

FIG. 6 shows a thermal-assisted magnetic recording head 15E according to a fifth embodiment of the present invention. The magnetic recording head 15E is basically of the same structure of that of the first embodiment. The differences from the first embodiment are as follows: the mirror surface 20a the of the reflecting converging element 20 is designed such that the reflecting converging element 20 has a converging point on an upper surface of a plate 25' serving as a slider; a waveguide 27 is formed in the plate 25'; and the very small structure (plasmon probe) 26 for generating near-field light is located at a lower end of the waveguide 27.

In the fifth embodiment, the plate 25' is not necessarily transparent and may be made of quarts, silicon or ceramic (AlTiC, zirconia, etc.). The waveguide 27 is formed of quarts, silicon or the like by photolithography. The very small structure 26 is a thin film of a metal such as Au.

In the fifth embodiment, the waveguide 27 is used. If the waveguide 27 is not used, however, the plate 25' must be transparent so as to converge light, and for the plate 25', a transparent substrate made of quarts or the like must be prepared. In a case of using a waveguide as in the fifth embodiment, only a small area of the plate 25' with a width of approximately several tens of microns must be transparent, and the other parts can be made of ceramic such as AlTiC. Ceramic has a large Young's modulus compared with quarts, and it is less likely that the ceramic plate 25' may bend when the recording head is raised. Accordingly, it is possible to make the plate 25' thinner, and it becomes possible to fabricate a thinner recording head.

According to the fifth embodiment, instead of the reflecting converging element 20, the reflecting converging element 21 with a Fresnel lens 21a used in the third embodiment or the reflective converging element 21 with a refractive index distributing type lens 21b used in the fourth embodiment may be used. Further, as the light source, the optical fiber 24 used in the second embodiment may be used.

Adjustment of Imaging Magnification by Use of a Spheroid of Revolution; See FIGS. 7a -9b A light beam from a surface emitting laser, a light beam from an end surface emitting laser or a light beam from an optical fiber have mutually different diameters. In using one of the lasers and the optical fiber as a light source, it is necessary to adjust the imaging magnification of the optical system (mirror surface 20a).

First, adjustment of the imaging magnification in a case wherein the mirror surface 20a is a spheroid of revolution is described. As FIGS. 7a -9b show, a spheroid of revolution has two focal points a and b, and when a light source is located at one of the focal points, for example, at the point a, a light beam emitted therefrom is converged on the other focal point, for example, on the point b.

For example, the mirror surface is supposed to be of a shape which is made by revolving an ellipsoid with a longer axial dimension of 2 and a shorter axial dimension of 1.732051 around the longer axis. In this case, the imaging magnification in the shorter axial direction is always 1 (see FIGS. 7b and 8b). Regarding the imaging magnification in the longer axial direction, when the direction of the principle ray is at an angle of 60 degrees to the longer axis (the line drawn between the points a and b), it is 1 (see FIG. 7a). When the direction of the principle ray is at an angle of 90 degrees to the longer axis, the magnification in the longer axial direction is 0.717, and when the direction of the principle ray is at an angle of 60.9827 degrees, the magnification in the longer axial direction is 1.395 (see FIG. 8a).

Also, the magnification in the shorter axial direction can be adjusted by shifting the light source in a direction perpendicular to the longer axis. When the divergent angle of the light beam is 90 degrees ($2\theta=90°$), as long as the shift of the light source is about 10% of the radius of curvature of the spheroid of revolution at the area where the principle ray reaches, the adjustment of the magnification by the shift of the light source is sufficiently effective without using a higher-order aspherical surface. When the radius of curvature of the spheroid of revolution is 0.866025, by shifting the light source from the focal point by a distance 0.0866 farther from the mirror surface 20a, the magnification in the shorter axial direction becomes 1.21, and by shifting the light source from the focal point by a distance 0.0866 closer to the mirror surface 20a, the magnification in the shorter axial direction becomes 0.826 (see FIGS. 9a and 9b). When the mirror surface 20a is formed into an aspherical surface, larger changes in the magnification in the shorter axial direction are possible, and adjustment of the magnification in the shorter axial direction in the same extent as the adjustment of the magnification in the longer axial direction is possible.

Adjustment of Imaging Magnification by use of a Paraboloid of Revolution; See FIGS. 10 and 11

Next, adjustment of the imaging magnification in a case wherein the mirror surface 20a is a paraboloid of revolution is described. In this case, two mirror surfaces are used.

Figure 10:
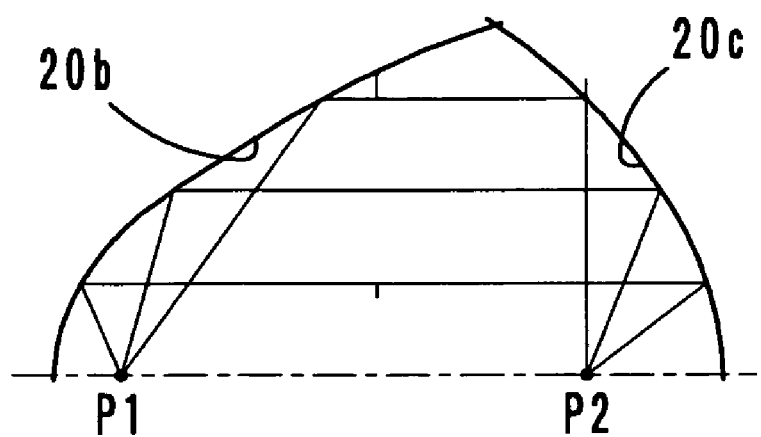
FIG. 10 is an illustration showing a first exemplary paraboloid of revolution.

FIG. 10 shows a first example. The mirror surface 20a is composed of a first mirror surface 20b which is a first paraboloid of revolution and a second mirror surface 20c which is a second paraboloid of revolution 20c. The first paraboloid of revolution 20b is formed by revolving a parabola having a vertex at a position −0.5 distant from a light source P1 and having a paraxial radius of curvature of +0.3 around an axis drawn between the light source P1 and the vertex. The second paraboloid of revolution 20c is formed by revolving a parabola having a vertex at a position 1.3 distant from the vertex of the first paraboloid of revolution 20b along the axis of revolution of the first paraboloid of revolution 20b and having a paraxial radius of curvature of −0.6 around an axis passing the vertex and extending in perpendicular to the parabola.

The light source P1 radiates light toward the first paraboloid of revolution 20b at an angle of +73.7398 degrees to the axis of revolution, and the numerical aperture NA of the first paraboloid of revolution 20b is 0.5. An imaging point P2 appears on the axis of revolution, and the imaging magnification is 1. The principle ray is imaged at an angle of 67.38014 degrees to the axis of revolution.

Figure 11:
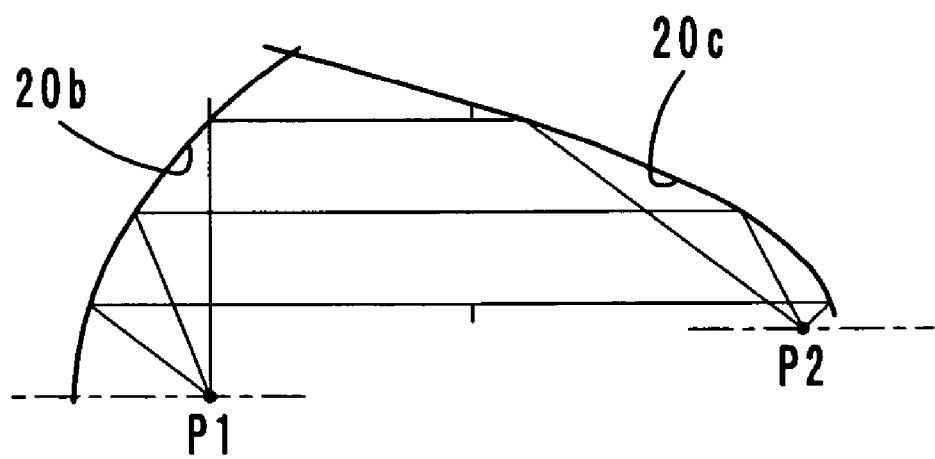
FIG. 11 is an illustration showing a second exemplary paraboloid of revolution.

FIG. 11 shows a second example. The mirror surface 20a is composed of a first mirror surface 20b which is a first paraboloid of revolution and a second mirror surface 20c which is a second paraboloid of revolution 20c. The first paraboloid of revolution 20b is formed by revolving a parabola having a vertex at a position −0.3 distant from a light source P1 and having a paraxial radius of curvature of +0.6 around an axis drawn between the light source P1 and the vertex. The second paraboloid of revolution 20c is formed by revolving a parabola having a vertex at a position 1.5 distant from the vertex of the first paraboloid of revolution 20b along the axis of revolution of the first paraboloid of revolution 20b and having a paraxial radius of curvature of −0.15 around an axis passing the vertex and extending in perpendicular to the parabola.

The light source P1 radiates light toward the first paraboloid of revolution 20b at an angle of +67.38014 degrees to the axis of revolution, and the numerical aperture NA of the first paraboloid of revolution 20b is 0.5. An imaging point P2 appears on the axis of revolution, and the imaging magnification is 1/1.6. The principle ray is imaged at an angle of −61.92751 degrees to the axis of revolution.

As describe above, combination of two mirror surfaces enables free design of the mirror surface 20a in accordance with the light radiating angle and imaging angle. Practically, it is not always necessary to locate the bottom of the transparent plate 25 (the slider surface) on the axis of revolution.

Other Embodiments

Although FIG. 1 shows the basic structure of the thermal-assisted recording apparatus, the basic structure can be designed arbitrarily, and the structure of the magnetic writing element can be designed arbitrarily. It is possible to provide a reading element for reading information out of a magnetic recording medium. Also, an end surface emitting laser may be used as the light source.

Although the present invention has been described with reference to the preferred embodiments above, it is to be noted that various changes and modifications are possible to those who are skilled in the art. Such changes and modifications are to be understood as being within the scope of the present invention.

What is claimed is:

1. A thermal-assisted magnetic recording head comprising:
   a slider;
   a light source unit, which is disposed on the slider, for emitting light in a direction away from a surface of a magnetic storage medium;
   a first optical element for reflecting and converging the light emitted from the light source unit; and
   a second optical element for generating near-field light from the light converged by the first optical element.

2. A thermal-assisted magnetic recording head according to claim 1, wherein the light source unit is an end surface emitting laser or a surface emitting laser.

3. A thermal-assisted magnetic recording head according to claim 1, wherein:
   the light source unit comprises a light source and a light guide, said light guide having, at an end, a reflecting surface for reflecting the guided light in the direction away from the surface of the magnetic storage medium.

4. A thermal-assisted magnetic recording head according to claim 1, wherein:
   the first optical element has a reflecting surface for reflecting and converging the light emitted from the light source unit; and
   the reflecting surface of the first optical element is a spheroid of revolution or a paraboloid of revolution.

5. A thermal-assisted magnetic recording head according to claim 1, wherein the first optical element has a diffraction grating for reflecting and converging the light emitted from the light source unit.

6. A thermal-assisted magnetic recording head according to claim 1, wherein the first optical element has a refractive index distributing type lens for reflecting and converging the light emitted from the light source unit.

7. A thermal-assisted magnetic recording apparatus comprising:
   a thermal-assisted magnetic recording head according to claim 1; and
   a mechanism for moving the thermal-assisted magnetic recording head and the magnetic storage medium relatively with each other.

8. A thermal-assisted magnetic recording head comprising:
   a light source unit for emitting light in a direction away from a surface of a magnetic storage medium;

a first optical element for reflecting and converging the light emitted from the light source unit;

a slider for supporting the first optical element on a first surface;

a second optical element for guiding the light converged by the first optical element; and a third optical element for generating near-field light from the light guided by the second optical element.

9. A thermal-assisted magnetic recording head according to claim 8, wherein the second optical element is a waveguide.

10. A thermal-assisted magnetic recording head according to claim 8, wherein the second optical element guides the light from the first surface of the slider to a second surface of the slider opposite to the first surface.

11. A thermal-assisted magnetic recording head according to claim 8, wherein the light source unit is an end surface emitting laser or a surface emitting laser.

12. A thermal-assisted magnetic recording head according to claim 8, wherein:

the light source unit comprises a light source and a light guide, said light guide having, at an end, a reflecting surface for reflecting the guided light in the direction away from the surface of the magnetic storage medium.

13. A thermal-assisted magnetic recording head according to claim 8, wherein:

the first optical element has a reflecting surface for reflecting and converging the light emitted from the light source unit; and the reflecting surface of the first optical element is a spheroid of revolution or a paraboloid of revolution.

14. A thermal-assisted magnetic recording head according to claim 8, wherein the first optical element has a diffraction grating for reflecting and converging the light emitted from the light source unit.

15. A thermal-assisted magnetic recording head according to claim 8, wherein the first optical element has a refractive index distributing type lens for reflecting and converging the light emitted from the light source unit.

16. A thermal-assisted magnetic recording apparatus comprising:

a thermal-assisted magnetic recording head according to claim 8; and a mechanism for moving the thermal-assisted magnetic recording head and the magnetic storage medium relatively with each other.

\* \* \* \* \*